Jan. 20, 1959   E. B. HENRY, JR   2,870,401
APPARATUS FOR TESTING BODIES OF MAGNETIC MATERIAL
Filed Jan. 6, 1954   2 Sheets-Sheet 1
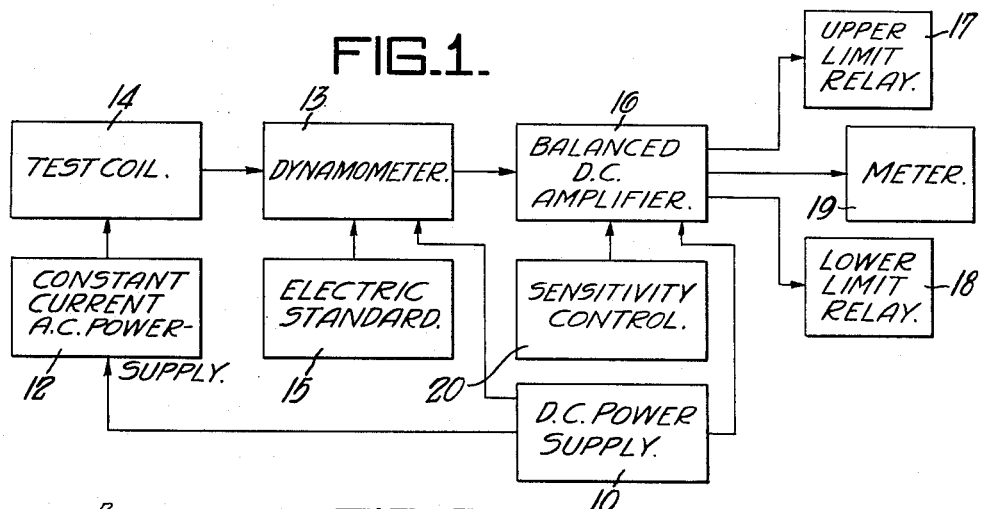
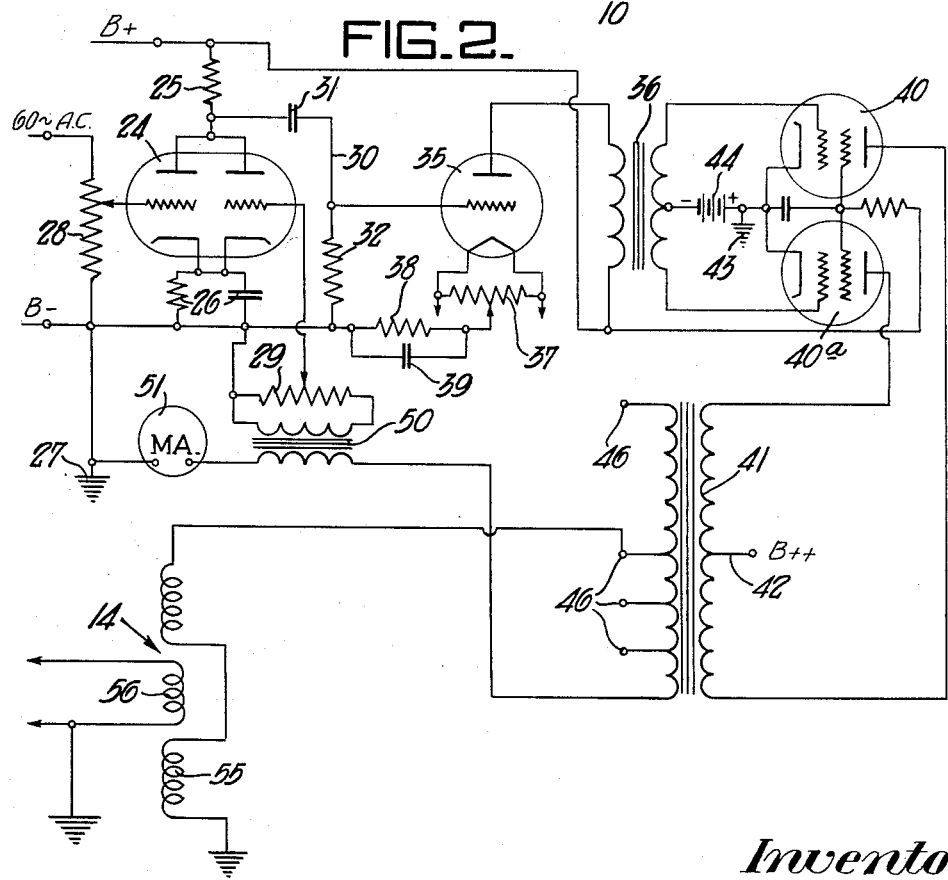
*Inventor:*
EDWIN B. HENRY, JR.,
by: Donald G. Dalton
his Attorney.

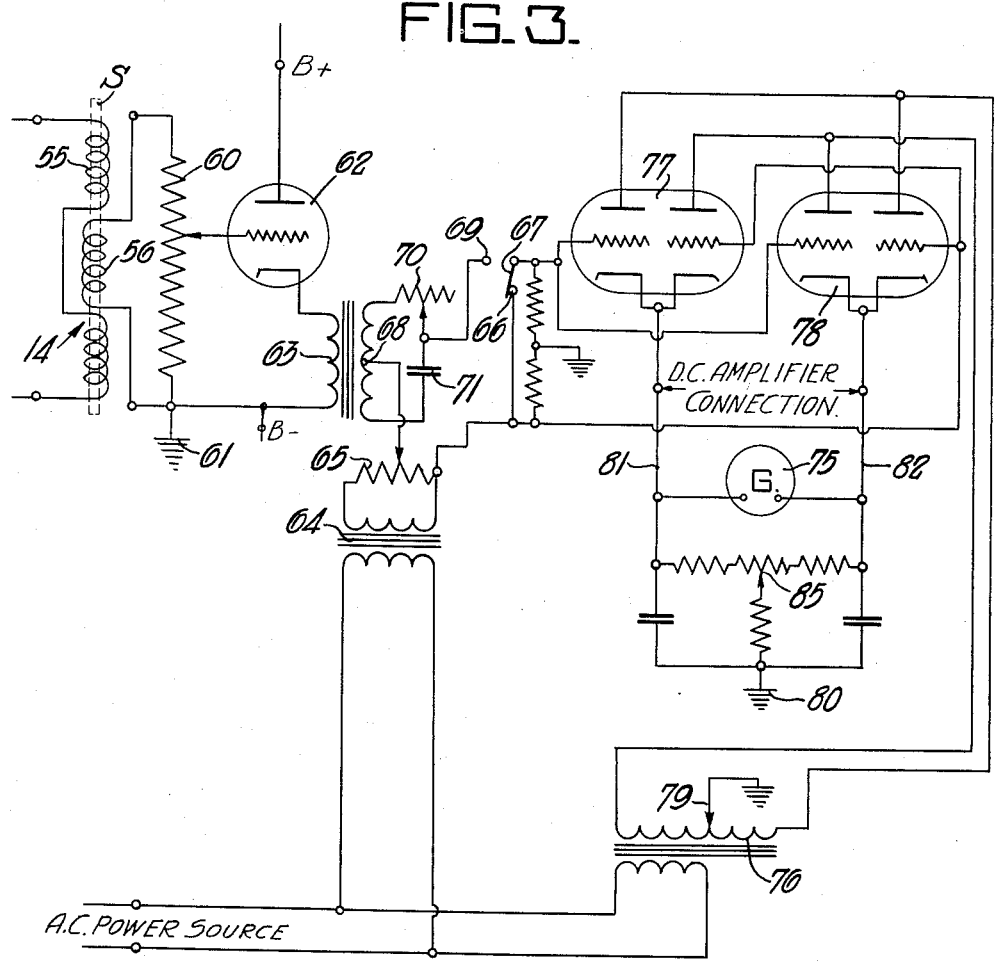

United States Patent Office 2,870,401
Patented Jan. 20, 1959

2,870,401

APPARATUS FOR TESTING BODIES OF MAGNETIC MATERIAL

Edwin B. Henry, Jr., Pittsburgh, Pa., assignor to United States Steel Corporation, a corporation of New Jersey Application January 6, 1954, Serial No. 402,550

11 Claims. (Cl. 324—34)

This invention relates to an improved apparatus for detecting differences in the physical properties or chemical composition of bodies of magnetic material.

The invention utilizes the well-known principle that alternating current in a primary winding produces a continually reversing magnetic field, which in turn induces alternating current in a secondary winding. Both the phase relation between the voltages in the two windings and the amplitude of voltage in the secondary vary with physical differences in a core placed within the windings and also with certain chemical differences (e. g., content of carbon, molybdenum, silicon, nickel and other substances). Consequently, when different bodies are used as cores, differences in these bodies can be detected by observing differences in phase and amplitude of the voltage induced in the secondary winding. Such tests conveniently can be conducted by observing the phase and amplitude of the voltage obtained with a standard core of known physical properties and chemical composition, and then observing deviations from these results obtained with test cores. These tests are useful, for example, for determining quickly whether ferrous bodies actually conform with a known standard, or for detecting hard or soft spots or flaws in a ferrous body of uniform cross section and composition.

An object of the invention is to provide an improved apparatus which can perform the foregoing test more rapidly and accurately than previous apparatus with which I am familiar.

A further object is to provide such apparatus in which a standard body is used as a core only briefly for setting up an electric standard in the apparatus and does not remain in the circuit where it can become heated and thereby acquire different magnetic characteristics and induce errors.

A further object is to provide apparatus of the foregoing type in which only a single test coil is used both for standard and test samples, thereby eliminating the need for manufacturing two identical coils, often a difficult procedure.

A further object is to provide an improved apparatus for this test in which mechanical parts are largely eliminated and replaced by electronic circuits.

A further object is to provide as a subcombination an improved means for producing an alternating current of constant amperage for energizing the primary winding of the test coil of the apparatus, or for other purposes where such current is needed.

In accomplishing these and other objects of the invention, I have provided improved details of structure, a preferred form of which is shown in the accompanying drawings, in which:

Figure 1 is a block diagram of an apparatus constructed in accordance with my invention;

Figure 2 is a schematic wiring diagram of the constant-current A. C. power supply; and Figure 3 is a schematic wiring diagram of the test coil, the electric standard, and the electronic dynamometer.

Referring first to Figure 1, the apparatus includes a D. C. power supply 10 that produces current of reasonably constant voltage. The output side of said power supply is connected to the D. C. input side of a constant-current A. C. power supply 172 and to an electronic dynamometer 13. The output side of the A. C. power supply is connected to the primary winding of a test coil 14, which has a secondary winding connected to the dynamometer 13. The apparatus also includes an electric standard 15 which is connected to the dynamometer and is energized from a constant-voltage A. C. source, preferably including a stabilizing transformer. Dynamometer readings can be indicated on a simple galvanometer incorporated therein, or optionally the dynamometer can be connected to the input side of a balanced D. C. amplifier 16, which likewise is energized from the D. C. power supply 10. The amplified reading then can be used to operate various relays and meters, such as upper and lower limit relays 17 and 18 and a galvanometer 19. A threshold or sensitivity control 20 also can be included for varying the sensitivity of said relays. The relays can be used to actuate any desired type of signaling device for giving an immediate indication of a nonconforming body in the test coil. The constant-current A. C. power supply 12, the electronic dynamometer 13, the test coil 14 and the electric standard 15 are shown in more detail in Figures 2 and 3 and hereinafter fully described. The other parts per se can be of any desired or standard construction, and hence are shown only in the block diagram.

Constant-current A. C. power supply

The A. C. power supply 12, includes an amplifier tube 24, for example a dual triode of the type commonly designated "6SN7". In the example the two plates of the dual triode are connected to a positive output terminal B+ of the D. C. power supply 10 via a load resistance 25, and the two cathodes are connected to a negative output terminal B— via a cathode bias resistor and condenser combination 26 and ground 27. The left control grid of this tube is connected to an alternating current source x—x via a potentiometer 28, which affords an excitation or magnetizing control. The right control grid is connected to a potentiometer 29, which affords a feedback control, as hereinafter described. During half the current cycle in the circuit x—x, the left grid is positive with respect to the bias voltage and the left side of the tube conducts more current, which increases the voltage drop across the load resistance 25. During the other half cycle this plate current decreases because the grid is more negative with respect to the bias voltage. A conductor 30 is connected between the current path through the tube and the ground 27. The connection to said current path is loctaed intermediate the resistance 25 and the tube 24. The conductor 30 contains a D. C. blocking condenser 31 and a grid resistor 32. Consequently this conductor allows positive and negative voltage pulses to appear across grid resistor 32 as current through the tube decreases and increases. The condenser 31 prevents the D. C. voltage which appears on the plates of tube 34 from being applied to the grid of tube 35.

The A. C. power supply next includes a driver amplifier tube 35, which can be a power triode such as that designated "6B4-G." The grid of this latter tube is connected to the conductor 30, intermediate condenser 31 and resistance 32, and the plate to a positive output terminal B+ of the D. C. power supply 10 through the primary winding of a driver transformer 36. The filament, which also forms the cathode, is connected to the ground via resistances 37 and 38 and a condenser 39 arranged as shown in Figure 2. The amplifier tube 35 conducts more current when positive pulses are applied to its grid and less current when negative pulses are applied. Consequently a pulsating direct current whose wave shape conforms to the input at the potentiometer 28 flows through the primary winding of the transformer 36.

The A. C. power supply next includes a push-pull power amplifier formed of two tubes 40 and 40a, such as those designated "6L6." The first grids of these tubes are connected to opposite ends of the secondary winding of the driver transformer 36. The plates of the two tubes are connected to opposite ends of the primary winding of an audio output transformer 41. This winding has a center tap 42 which is connected to a positive terminal B++ of the D. C. power supply preferably at a somewhat higher voltage than the plates of the tubes 25 and 35. For example, the terminal B++ to which the center tap 42 is connected can be at 360 volts positive, and the terminal B+ to which the plates of tubes 24 and 35 are connected can be at 300 volts positive. The cathodes of both tubes 40 and 40a are connected to a ground 43. A conventional fixed grid bias 44 is used in the circuit to these tubes.

The pulsating direct current in the primary winding of transformer 36 induces alternating current in the secondary winding thereof. During half the cycle of the latter current the first grid of tube 40 is positive with respect to the grid bias, and during the other half the first grid of the tube 40a is positive with respect to the grid bias. These tubes operate as a conventional class AB push-pull power amplifier. The resulting current in the primary winding of the transformer 41 induces alternating current in the secondary winding thereof. This secondary winding has a plurality of taps 46, any one of which can be connected to one end of the primary winding of the test coil 14. This arrangement enables the impedance of the secondary of transformer 41 to be matched approximately with that of the test coil, necessary for proper operation of the tubes 40 and 40a. The other ends of both the secondary winding of transformer 41 and the primary winding of test coil 14 are connected to grounds, whereby the primary winding of the test coil receives alternating current.

The primary winding of a feedback transformer 50 is connected between the end of the secondary winding of the transformer 41 and its ground. Preferably a milliammeter 51 is connected in series with these windings to indicate the value of the magnetizing current applied to the test coil. The potentiometer 29 is connected across the secondary winding of the feedback transformer 50. One end of this secondary winding is connected to ground. The arm of the potentiometer 29 is connected to the right grid of the tube 24.

The alternating current which flows through the secondary winding of the transformer 50 is 180° out of phase with the current in the circuit x—x. Potentials applied to both the right and left grids of tube 24 affect the plate current, but these effects oppose each other because of the foregoing phase relation. The current in the secondary of the transformer 50 is proportional to the magnetizing current applied to the test coil. If this current changes, such change causes a corresponding change in the potential applied to the right grid. Thus the extent to which this potential opposes that on the left grid increases when the magnetizing current increases and decreases when this current decreases. With the various impedances properly proportioned, the potential applied to the right grid maintains the conductivity of the tube at a level such that the magnetizing current remains constant, despite variations in the impedance of the test coil caused by different cores or variations in the current from the D. C. power source 10. The exact amperage of the magnetizing current can be adjusted by moving the arm of the potentiometer 28, and the extent of feedback by moving the arm of the potentiometer 29.

Test coil

The test coil 14 includes a primary winding 55 and a secondary winding 56. The primary winding is connected to the constant current A. C. power supply 12, as shown in Figure 2. The secondary winding is connected to the electronic dynamometer as shown in Figure 3 and hereinafter explained. The coils have an open core space for insertion of a sample S, which can be either a standard body or a test body. The magnetizing force applied to the sample is a function of the ampere-turns of the primary winding. The number of turns is of course constant, and the A. C. power supply 12 maintains the amperage constant; consequently the magnetizing force applied to samples during any series of tests remains constant. Nevertheless this force can be adjusted to an appropriate value by adjustment of the A. C. power supply. When the apparatus is used for sorting magnetic bodies, this value preferably is chosen at a region where the magnetization curve of a standard body has a steep slope to afford maximum sensitivity. When the apparatus is used for flaw detection, this value preferably is chosen to saturate the sample. Since the magnetizing force remains constant, the amplitude and phase of the voltage induced in the secondary winding 56 vary only with variations in the core material.

Electronic dynamometer and electric standard

The electronic dynamometer 13 includes first a potentiometer 60, which is connected across the secondary winding 56 of the test coil 14. Thus there is always the same resistance connected across the secondary winding, eliminating another possible variable that might interfere with accuracy of the test. The circuit of the secondary winding is grounded at 61. The arm of the potentiometer 60 is connected to the grid of a cathode follower tube 62, for example of the type designated "6J5." The plate of this tube is connected to a positive output terminal of the D. C. power supply 10, for example, the aforementioned terminal B+. The cathode is connected to the primary winding of an audio interstage transformer 63 and thence to the ground 61, which furnishes a connection to the negative terminal of the D. C. power supply 10.

During half the voltage cycle in the secondary winding 56 of the test coil the grid of tube 62 receives a positive potential. The tube then conducts more current which flows through the primary winding of the transformer 63. On the negative half-cycle of grid voltage the tube current is decreased in proportion to the magnitude of the negative voltage. The magnitude and polarity of the potential applied to the grid and hence the conductivity of the tube vary with the amplitude and polarity of voltage induced in the secondary winding of the test coil. The application of positive potentials to the grid of the cathode follower is necessarily in accordance with the phase of this voltage. Therefore the amplitude and phase of voltage applied to the primary coil of transformer 63 are functions of the voltage induced in the secondary winding 56 of the test coil. The potentiometer 60 affords a means for adjusting the portion of the induced voltage in the secondary winding 56 applied to the grid of tube 62 to assure that the current remains within the operating range of the apparatus.

The electric standard 15 comprises essentially a source of standard external voltage, a transformer 64 and a potentiometer 65. The primary winding of transformer 64 is connected to the external voltage source, which preferably contains a stabilizing transformer to maintain constant voltage. The potentiometer 65 is connected across the secondary winding of this transformer. A "balance" contact 66 of a double-throw switch 67 is connected to one end of this secondary winding. Thus the output of the transformer 64 appears between the contact 66 and the arm of the potentiometer 65.

The arm of potentiometer 65 is connected to a center tap 68 in the secondary winding of the transformer 63. The switch 67 also has a "test" contact 69. This contact is connected to one end of the secondary winding of the transformer 63 through a variable resistance 70 and to the other end through a condenser 71. The resistance 70 and condenser 71 function as a phase shifter in accordance with known principles. Briefly the condenser acts as a substantially pure capacitance whereby voltage transmitted through it is 90° out of phase with that transmitted through the resistance 70. Varying the magnitude of the resistance 70 of course varies the relative magnitude of this resistance and the capacitance. Thus the resultant can be shifted through an angle that approaches 180° by varying the resistance. The output of the transformer 63 appears between the "test" contact 69 of the switch 67 and the arm of the potentiometer 65.

The potentiometer 65 affords a means for balancing the amplitude of the voltage output from the electric standard against that from the test coil. The phase shifter 70, 71 affords a means for balancing he phase relation of these two voltages. In the circuit illustrated the phase shifter actually varies the phase of the voltage output from the test coil, while that from the electric standard remains constant. Nevertheless it would be an obvious equivalent to vary the phase of the voltage output from the electric standard while that from the test coil remains constant. As hereinafter explained, the apparatus is set up with a standard sample in the test coil so that these voltages are equal in amplitude and opposite in phase. Deviations with test samples in the test coil indicate a non-conforming sample.

The electronic dynamometer has a galvanometer 75 to indicate whether or not the two voltage outputs are in balance. The galvanometer is connected in a circuit which includes a power transformer 76 and amplifier tubes 77 and 78, for example dual triodes of the type designated "6SN7." The primary winding of the transformer 76 is connected to the same alternating current source as the transformer 64. One end of the secondary winding is connected to the left plate of the tube 77 and right plate of the tube 78. The other end of this secondary winding is connected to the right plate of the tube 77 and left plate of the tube 78. The secondary winding also has a center tap 79 which is grounded. The cathodes of both tubes 77 and 78 are connected to a ground 80 via parallel conductors 81 and 82 respectively, across which the galvanometer 75 is connected. As long as these conductors are at the same potential, no current flows through the galvanometer, but when there is a difference current commences to flow. The conductors 81 and 82 also are connected by a set of balance resistances 85 which compensate for any inherent differences in conductivity of the two tubes 77 and 78.

The right grids of both tubes 77 and 78 are connected to one end of the secondary winding of the transformer 64, and the left grids to the movable contact of the switch 67. When this switch is set to its "balance" position, all the grids receive the same potential. Conductivity through both tubes should be the same, and can be made thus by regulating the resistances 85. During half the cycle of the alternating current in the secondary winding of transformer 76, the current path is from the right end of this secondary winding through the left side of tube 77 and the right side of tube 78, the parallel conductors 81 and 82, and the ground to the center tap 79. During the other half cycle the current path is from the left end of the secondary winding through the right side of tube 77 and the left side of tube 78, the parallel conductors 81 and 82, and the ground to the center tap 79. There is of course no reading on the galvanometer 75.

Next the switch 67 is moved to its "test" position. The left grids of tubes 77 and 78 now receive their potential from the secondary windings of the transformers 63 and 64 in series. As already stated, the apparatus is set up with a standard sample so that the output of the transformer 64 is equal in amplitude and opposite in phase to the resultant output of the transformer 63 and phase shifter 70, 71. With a standard sample these outputs cancel each other and there still is no potential difference applied to any of the grids of the tubes 77 and 78. With a non-conforming sample the voltage output of transformer 63 differs in amplitude and/or phase opposition from that of transformer 64 and produces a mis-balance of the circuit. There is a difference in potential between the contacts 66 and 69 of switch 67. The right grids of tubes 77 and 78 always remain at the potential of contact 66. As long as the switch 67 is in its "test" position, the left grids assume the potential of contact 69. The conducting half of one tube conducts more than the conducting half of the other tube and thus causes a difference of potential between conductors 81 and 82. This difference produces a reading on the galvanometer 75, which indicates a non-conforming sample in the test coil.

From the foregoing description it is seen that my invention affords a precise means for comparison of magnetic characteristics of samples. A standard sample is used only briefly while the electric standard is set up. Standard samples are subject to heating if they remain in a circuit for a prolonged period, and thus they acquire different magnetic characteristics as a series of tests progresses. My apparatus employs only a single test coil for both standard and test samples. Thus there is no reliance on obtaining two absolutely identical test coils, as where separate coils are used for the standard and test samples. My apparatus has a further advantage of utilizing a minimum of mechanical parts.

While I have shown and described only a single embodiment of the invention, it is apparent that modifications may arise. Therefore, I do not wish to be limited to the disclosure set forth but only by the scope of the appended claims.

I claim:

1. In an apparatus for testing bodies of magnetic material, which apparatus includes a single test coil having primary and secondary windings and adapted to receive either a standard body or a test body as a core, a first source of alternating current connected to said primary winding, a second source of alternating current, an electric standard connected to said second source, balancing means connected to said electric standard and to said secondary winding and adapted to balance the phase and amplitude of the voltage outputs therefrom when a standard body is placed in said test coil, and means for indicating unbalance in the phase or amplitude of these voltages when a non-conforming body is placed therein, the combination therewith of a device for maintaining the current from said first source at constant amperage despite variations in the impedance of said primary winding.

2. A combination as defined in claim 1 in which said device comprises a dual triode tube, means for supplying a plate current thereto, an amplifier circuit connected to the path of said plate current for producing an amplified alternating current output, means for applying alternating current potentials to one of the grids of said tube, and feedback means connected with the output from said amplifier circuit for applying opposing alternating current potentials to the other grid thereof.

3. An apparatus for testing bodies of magnetic material comprising a single test coil having primary and secondary windings and adapted to receive either a standard body or a test body as a core, an electric standard, means for supplying alternating current to said primary winding and to said electric standard, means connected between said secondary winding and said electric standard for balancing their alternating current voltage outputs both as to amplitude and phase when a standard body is placed in said test coil, a circuit including a pair of vacuum tubes having grids connected to receive potentials from said electric standard and from said secondary winding, said tubes conducting equally when the voltage outputs are balanced both as to amplitude and phase and unequally when they are unbalanced as to either, and means for indicating whether said tubes are conducting equally or unequally.

4. An apparatus for testing bodies of magnetic material comprising a single test coil having primary and secondary windings and adapted to receive either a standard body or a test body as a core, a first source of alternating current connected to said primary winding, a potentiometer having its resistor connected across said secondary winding, a cathode follower connected to said potentiometer to present a constant load impedance to current induced in the latter winding, a transformer having its primary winding connected to said cathode follower to receive the current transmitted thereby, a second alternating current source, a phase shifter and a potentiometer connected between the secondary winding of said transformer and said second current source for balancing the voltage outputs thereof when a standard body is placed in said test coil, and means for indicating unbalance of these outputs when a non-conforming body is placed therein.

5. An apparatus for testing bodies of magnetic material comprising a single test coil having primary and secondary windings and adapted to receive either a standard body or a test body as a core, a first source of alternating current connected to said primary winding and including a device for maintaining the amperage constant, a potentiometer having its resistor connected across said secondary winding, a cathode follower connected to said potentiometer and adapted to conduct a plate current to present a constant load impedance to current induced in the latter winding, the amplitude and phase of the voltage in the plate circuit being a function of the amplitude and phase of the voltage in said secondary winding, a transformer having its primary winding in the plate circuit, a second alternating current source, a phase shifter and a potentiometer connected between the secondary winding of said transformer and said second current source for balancing the voltage outputs thereof when a standard body is placed in said test coil, and means for indicating unbalance of these outputs when a non-conforming body is placed therein.

6. An apparatus as defined in claim 5 in which the device for maintaining the amperage constant includes a dual triode tube, means for supplying a plate current thereto, an amplifier circuit connected to the path of said plate current for producing an amplified alternating current output, means for applying potentials to one of the control grids of said tube to cause the plate current to flow, and feedback means connected with the output from said amplifier circuit for applying opposing potentials to the other control grid thereof.

7. An apparatus as defined in claim 5 in which said last named means includes two vacuum tubes which conduct equally when the voltages are balanced, and a connection between said phase shifter and said second named potentiometer and the control grids of said tubes to change the conductivity of one of the tubes when the voltages are unbalanced.

8. An apparatus as defined in claim 5 in which said last named means includes two dual triode tubes, means for supplying plate current to said tubes, a connection between one control grid of each tube and said second named potentiometer, a connection between the other control grid of each tube and said phase shifter, said tubes conducting equal plate currents when the voltages are balanced and unequal plate currents when the voltages are unbalanced, and a device connected across the paths of said plate currents for registering differences therein.

9. A device for producing alternating current of constant amperage comprising amplifier tubes, a common plate current circuit connected to said tubes and including a load resistor, an amplifier circuit connected to said plate current circuit for producing an amplified alternating current output, means for applying alternating current potentials to one of the control grids of said tubes to control the flow of plate current, and feedback means connected with the output of said amplifier circuit for applying alternating current potentials of opposite phase to another control grid thereof.

10. A device as defined in claim 9 in which said feedback means includes a transformer having its primary winding connected with output of said amplifier circuit, and a potentiometer having its resistor connected across the secondary winding of said transformer and also connected to the cathode return circuit of said tubes and its slider connected to the grid.

11. A device for producing alternating current of constant amperage comprising a dual triode tube, a common plate current circuit connected to said tube and including a load resistor, an amplifier circuit connected to said plate current circuit between said tube and said load resistor for producing an amplified alternating current output, an alternating current source connected to one of the control grids of said tube for applying potentials to control the flow of plate current, a feedback transformer having its primary winding connected in the output circuit from the amplifier, and a feedback potentiometer having its resistor connected across the secondary winding of said transformer and also connected to the cathode return of said tube and its slider connected to the other control grid to apply alternating current potentials thereto, the voltages in the two circuits connected to the respective control grids being 180° out of phase so that the grid potentials oppose each other.

References Cited in the file of this patent

UNITED STATES PATENTS

| | | |
|---|---|---|
| 2,098,991 | Zuschlag | Nov. 16, 1937 |
| 2,290,330 | Irwin | July 21, 1942 |
| 2,303,505 | Schilling | Dec. 1, 1942 |
| 2,309,852 | Lewis | Feb. 2, 1943 |
| 2,351,201 | Gillis | June 13, 1944 |
| 2,455,792 | Meunier | Dec. 7, 1948 |
| 2,505,701 | Zuschlag | Apr. 25, 1950 |
| 2,542,057 | Relis | Feb. 20, 1951 |
| 2,589,723 | Miller | Mar. 18, 1952 |
| 2,660,704 | Harmon et al. | Nov. 24, 1953 |
| 2,673,613 | Irwin | Mar. 30, 1954 |